(12) United States Patent
Davis

(10) Patent No.: US 9,776,137 B2
(45) Date of Patent: Oct. 3, 2017

(54) RECOVERY OF REGENERANT ELECTROLYTE

(75) Inventor: Thomas A. Davis, El Paso, TX (US)

(73) Assignee: Board of Regents, The University of Texas System, Austin, TX (US)

(*) Notice: Subject to any disclaimer, the term of this patent is extended or adjusted under 35 U.S.C. 154(b) by 1868 days.

(21) Appl. No.: 12/617,250

(22) Filed: Nov. 12, 2009

(65) Prior Publication Data

US 2010/0116663 A1    May 13, 2010

Related U.S. Application Data

(60) Provisional application No. 61/198,896, filed on Nov. 12, 2008.

(51) Int. Cl.
*B01D 61/44* (2006.01)
*B01D 61/02* (2006.01)

(52) U.S. Cl.
CPC .......... *B01D 61/44* (2013.01); *B01D 61/025* (2013.01); *B01D 2311/2623* (2013.01); *Y10T 428/31504* (2015.04); *Y10T 428/31725* (2015.04)

(58) Field of Classification Search
CPC ................ B01D 61/42; B01D 61/44; B01D 61/46–61/54
USPC ......... 204/521, 523, 528, 532; 205/748, 749
See application file for complete search history.

(56) References Cited

U.S. PATENT DOCUMENTS

| | | | |
|---|---|---|---|
| 3,719,594 A * | 3/1973 | Borochaner | 210/190 |
| 4,032,452 A | 6/1977 | Davis | 210/243 |
| 4,285,819 A | 8/1981 | Yen et al. | 210/679 |
| 4,636,295 A * | 1/1987 | Ball et al. | 204/529 |
| 4,677,027 A | 6/1987 | Porath et al. | 428/407 |
| 4,880,513 A | 11/1989 | Davis et al. | 204/519 |
| 5,503,729 A | 4/1996 | Elyanow et al. | 204/630 |
| 5,679,228 A | 10/1997 | Elyanow et al. | 204/524 |
| 5,788,826 A | 8/1998 | Nyberg | 204/536 |
| 6,030,535 A | 2/2000 | Hayashi et al. | 210/652 |
| 6,258,278 B1 * | 7/2001 | Tonelli et al. | 210/652 |
| 6,362,266 B1 | 3/2002 | Buchholz et al. | 524/318 |
| 7,083,730 B2 | 8/2006 | Davis | 210/652 |
| 7,132,052 B2 | 11/2006 | Rawson et al. | 210/652 |
| 7,314,569 B2 | 1/2008 | Cadena et al. | 219/681 |
| 7,459,088 B2 | 12/2008 | Davis | 210/702 |
| 2006/0011550 A1 * | 1/2006 | Bourke et al. | 210/670 |
| 2006/0060532 A1 | 3/2006 | Davis | 210/652 |
| 2006/0231495 A1 | 10/2006 | Freydina et al. | 210/670 |

OTHER PUBLICATIONS

International Search Report and Written Opinion, issued in International Application No. PCT/US09/64203, mailed Jan. 27, 2010.
(Continued)

*Primary Examiner* — Steven A. Friday
(74) *Attorney, Agent, or Firm* — Kermit D. Lopez; Luis M. Ortiz; Ortiz & Lopez, PLLC

(57) ABSTRACT

Methods, systems and compositions for recovery of regenerant ions from spent regenerant solution by utilization of electrodialysis are provided. For example, in certain aspects methods for separating spent regenerant using an electrodialysis system comprising selective membranes are described. Furthermore, the invention provides methods for treating a friable solid ion-removal material to prevent fragmentation during regeneration.

15 Claims, 9 Drawing Sheets

(56) References Cited

OTHER PUBLICATIONS

Clifford et al., "Arsenic ion-exchange process with reuse of spent brine," Proceedings of the 1998 AWWA Annual Conference, Jun. 21-25, 1998, Water Research, vol. C, pp. 491-514, American Water Works Assoc., Denver, CO.
Clifford et al., "As removal using ion exchange with spent brine recycling," *Journal AWWA*, 95:119-130, 2003.
Ghurye et al., "Combined arsenic and nitrate removal by ion exchange," *Journal AWWA*, 91:85-96, 1999.
Wang et al., "Arsenic removal from drinking water by ion exchange and activated alumina plants," Report from Battelle, Columbus, EPA/600/R-00/088, Oct. 2000, http://epa.gov/nrmrl/pubs/600r00088/600r00088.pdf.

\* cited by examiner

RECOVERY OF REGENERANT ELECTROLYTE

This application claims priority to U.S. Application No. 61/198,896 filed on Nov. 12, 2008, the entire disclosure of which is specifically incorporated herein by reference in its entirety without disclaimer.

BACKGROUND OF THE INVENTION

1. Field of the Invention

Embodiments relate generally to the field of treatment of aqueous solutions. More particularly, embodiments concern the use of electrodialysis for selective separation of ions from regeneration of solid ion-removal material such as, for example, ion-exchange resins.

2. Description of Related Art

Solid ion-removal material such as ion exchange resins are commonly used for selective removal of dissolved ions from water. Certain of these dissolved ions, whether in the form of cations or anions, are particularly undesirable. For example, calcium and magnesium ions increase the "hardness" of the water and sulfate ions contribute to corrosion and scaling problems in industrial applications. These ions are commonly found in water extracted from mining operations, making disposal of this water problematic. Ion exchange resin beads are used selectively to absorb cations or anions onto the resin beads and in so doing become progressively loaded with contaminant ions. Regeneration of these resin beads therefore becomes necessary in order to remove the contaminant ions from the resin.

Salt solutions are often used for regeneration of ion-exchange resins that are employed for removing valuable or objectionable ions from aqueous solutions. For example in water softening, the resins are used to remove hardness ions (such as calcium, magnesium, strontium, radium, and barium ions) from water and would become substantially saturated with the hardness ions over time of use. Usually highly concentrated solution of salt like NaCl may be used to regenerate the resins to displace hardness ions from the resins, and a spent regenerant with residual salt and mostly hardness ions will be produced. The spent regenerant is usually then discarded.

Although NaCl is not very expensive, its disposal can be problematic in some places. For example, discharging that spent regenerant containing salt to the local sewer, water body or the ground results in an increase in the salinity of the receiving body. If residual salt in the spent regenerant could be recycled, then the discharge would comprise primarily the hardness ions that are removed from the original water. A water softening system that has less salt in the discarded brine would be advantageous to the environment. However, recycling salt from the spent regenerant could be expensive and time consuming.

Therefore, there remains a need to develop methods and systems to address the problems in recycling spent regenerant from salt-regeneration of solid ion-removal material such as ion exchange resins.

SUMMARY OF THE INVENTION

Aspects of the present invention are directed to a novel method and system for recovery of regenerant ions from a spent regenerant by utilization of electrodialysis comprising selective membranes. In so doing, the invention eliminates the necessity to store and use large quantity of salt regenerants and reduces the waste and problems from discharge of spent regenerant. Accordingly, in a first embodiment there is provided a process for recovery and/or reuse of ions from a spent regenerant comprising the steps of: a) providing a solution of spent regenerant from regeneration of a first solid ion-removal material with a regenerant; and b) treating the spent regenerant with an electrodialysis system.

In a certain embodiment, the regenerant may comprise a monovalent salt, such as sodium chloride. Specifically, the spent regenerant may comprise a mixture of monovalent ions and multivalent ions. The monovalent ions may be from the monovalent salt regenerant, and the multivalent ions may be from the contaminating ions that are intended to be removed from the solid-removal material by regeneration. For example, the multivalent ions may be cations such as calcium, magnesium, barium, strontium, radium or a combination thereof, or anions such as chromate, arsenate, selenate, sulfate, or a combination thereof. In a particular aspect, the process may be used for treatment of a spent regenerant in a water softening system. In another aspect, the process may be used for treatment of a spent regenerant in arsenate and/or sulfate removal.

In another embodiment, the regenerant may comprise an inorganic salt and the spent regenerant may comprise inorganic ions and organic ions. In order to separate organic ions from inorganic ions, certain aspects of the invention may provide an electrodialysis system comprising a selective membrane, wherein the selective membrane may have higher permeability for inorganic ions than for organic ions, therefore separating the spent regenerant into at least a first stream and a second stream, the first stream enriched in the inorganic ions and the second stream enriched in the organic ions.

In certain aspects, the electrodialysis system may have a selective membrane, wherein the selective membrane has higher permeability for the monovalent ions than for the multivalent ions, thereby separating the spent regenerant into at least a first stream and a second stream, the first stream enriched in the monovalent ions and the second stream enriched in the multivalent ions. In a specific embodiment to achieve the selective separation, the electrodialysis system has a plurality of repeating cells, wherein each cell comprises a single type of selective membrane, and in a further embodiment, each cell may comprise a non-selective membrane. For example, the selective membrane may impair the transport of multivalent cations, such as Neosepta® CIMS membrane, Neosepta® CMS membrane, or Neosepta® CMX-S membrane. Alternatively, the selective membrane may impair the transport of multivalent anions, such as Neosepta® ACS membrane.

As used herein, a "selective membrane" refers to any membrane that has a restriction of permeation of macromolecules or ions across the membrane on the basis of molecular size, number of charges, or physical configuration, but excludes the selectivity that permeates all anions and no cations or the selectivity that permeates all cations and no anions. A "single type of selective membrane" may refer to a type of selective membrane having higher permeability for monovalent cations than for multivalent cations, a type of selective membrane having higher permeability for monovalent anions than for multivalent anions, a type of selective membrane having higher permeability for inorganic cations than for organic cations, or alternatively a type of selective membrane having higher permeability for inorganic anions than for organic anions, but excludes the use of a combination of these single types of selective membranes. As used herein, that "each cell comprises a single type of selective membrane" refers to that each cell comprises only a type of selective membrane, but may or may not include more than a type of non-selective membrane. As used herein, a "non-selective membrane" refers to a membrane that has essentially no selectivity or restriction of permeation on the basis of molecular size, number of charges, or physical configuration, and may include the selectivity that permeates essentially all anions and essentially no cations or the selectivity that permeates essentially all cations and essentially no anions, such as ordinary cation-exchange membranes or anion-exchange membranes.

In another embodiment, each repeating cell of the electrodialysis system may comprise a first membrane permeable to the cations of the monovalent salt, a second membrane with higher permeability of the anions of the monovalent salt than for the multivalent anions, and a third membrane permeable to anions, thereby separating the spent regenerate into at least a first stream enriched in the monovalent salt, a second stream enriched in the multivalent anion, and a third stream substantially or completely depleted of ions.

Certain further aspects of the process may comprise reusing the first stream for regeneration of the first or a second solid ion-removal material. In a certain embodiment, the monovalent ions in the first stream or the multivalent ions in the second stream may be further concentrated. The concentrating methods may include, but not be limited to, evaporation, reverse osmosis, nanofiltration, a second electrodialysis, or a combination thereof. In a particular embodiment, the concentrating method may comprise a second electrodialysis and reverse osmosis. For example, the second electrodialysis may comprise non-selective membranes.

In a specific embodiment, the multivalent ions may comprise sulfate or may comprise sulfate and arsenate. To remove sulfate from the spent regenerate, certain aspects of the process may further comprise crystallizing a sulfate salt. Particularly, the crystallizing may comprise operating the second electrodialysis at a temperature effective to increase the solubility of the sulfate salt to form a high temperature stream concentrated in sulfate, and cooling the high temperature stream to form crystals of the sulfate salt. For example, such a temperature effective to increase the solubility of the sulfate salt may be at or about 30°, 31°, 32°, 33°, 34°, 35° C., or any range derivable therein.

In a certain embodiment, there may also be provided a process for recovery of ions from a spent regenerant comprising the steps of: a) providing an aqueous solution of spent regenerant from regeneration of solid ion-removal material with a regenerant solution comprising an inorganic salt, wherein the spent regenerant comprises a mixture of inorganic ions and organic ions; and b) contacting the spent regenerant with an electrodialysis system having a selective membrane, wherein the selective membrane has higher permeability for the inorganic ions than for the organic ions, thereby separating the spent regenerant into at least a first stream and a second stream, the first stream enriched in the inorganic ions and the second stream enriched in the organic ions. In certain aspects, the organic ions comprise anions and the solid material has anion-exchange characteristics. For example, the organic anions may be humic substances. In some other aspects, the organic ions comprise cations and the solid material has cation-exchange characteristics. For example, the organic cations may be quaternary ammonium compounds. In a further embodiment, the electrodialysis system may have a plurality of repeating cells, wherein each cell may comprise a single type of selective membranes and may further comprise a non-selective membrane. For example, the single type of selective membrane may have higher permeability for inorganic cations than for organic cations; in another aspect, the single type of selective membrane may have higher permeability for inorganic anions than for organic anions. Non-limiting examples of such membranes may include membranes used in the dialysis of salts, such as membranes characterized by low molecular weight cutoff.

In a further embodiment, there may be provided a composition comprising a solid ion-removal material and a polyelectrolyte, wherein the polyelectrolyte exits as a film on the surface of the solid ion-removal material. Such a solid ion-removal material may be a friable material such as iron oxide or alumina. Specifically, the polyelectrolyte is polyamine or any polyelectrolyte that may form a film on the surface of a solid ion-removal material by any method of microencapsulation known in the art.

In a still further embodiment, there may be provided a process for treatment of a solid ion-removal material comprising the steps of: a) providing a solid ion-removal material imbibed with a cross-linking agent; and b) treating the solid ion-removal material with an aqueous solution of a polyelectrolyte to form a film of cross-linked polyelectrolyte on the surface of the solid ion-removal material. In a certain embodiment, the cross-linking agent can be any agent capable of rendering the polyelectrolyte insoluble in an aqueous solution, and it does not necessarily form a chemical bond between the ion-removal material and the polyelectrolyte. Such a cross-linking agent may be dibromopropane.

In a further aspect, the process may further comprise removing arsenate from a feed solution using the treated solid ion-removal material, regenerating the treated solid ion-removal material using a monovalent salt to produce a spent regenerant, and/or recovering the monovalent salt from the spent regenerant by electrodialysis. The electrodialysis may be in accordance with any of the processes or systems described above.

In a further embodiment, the treatment process may further comprise soaking the solid-removal material with a cross-linking agent to provide the solid ion-removal material imbibed with the cross-linking agent. After step b), as described above, the treatment process may further comprise removing the solid ion-removal material from the polyelectrolyte, rinsing the uncrosslinked polyelectrolyte from the surface of the ion-removal material, and/or removing the unreacted cross-linking agent from the ion-removal material, for example by evaporation.

Embodiments discussed in the context of methods and/or compositions of the invention may be employed with respect to any other method or composition described herein. Thus, an embodiment pertaining to one method or composition may be applied to other methods and compositions of the invention as well.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or system that "comprises," "has," "includes" or "contains" one or more steps or elements possesses those one or more steps or elements, but is not limited to possessing only those one or more elements. Likewise, a step of a method or an element of a system that "comprises," "has," "includes" or "contains" one or more features possesses those one or more features, but is not limited to possessing only those one or more features. Furthermore, a system or structure that is configured in a certain way is configured in at least that way, but may also be configured in ways that are not listed.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

As used herein the specification, "a" or "an" may mean one or more. As used herein in the claim(s), when used in conjunction with the word "comprising", the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

Throughout this application, the term "about" is used to indicate that a value includes the inherent variation of error for the system, the method being employed to determine the value, or the variation that exists among the study subjects.

Other objects, features and advantages of the present invention will become apparent from the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein. Repeated use of reference characters in the present specification and drawings is intended to represent the same or analogous features or elements of the present invention.

DESCRIPTION OF ILLUSTRATIVE EMBODIMENTS

I. Introduction

Figure 1:
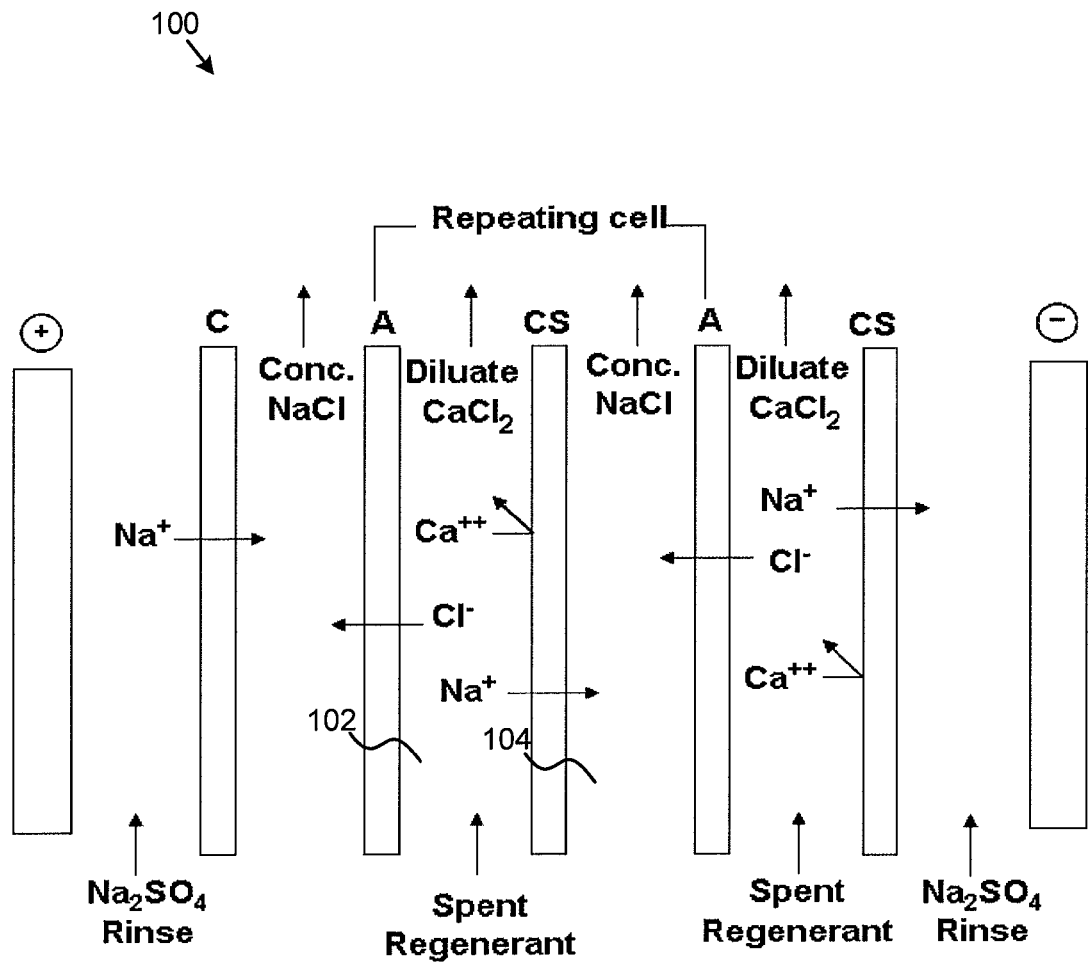
FIG. 1 is a schematic representation illustrating one embodiment of the invention of an electrodialysis membrane arrangement.

Example embodiments relate to methods and systems for recovery of regenerant salt from the spent regenerant of regeneration processes by electrodialysis (ED). Further, in accordance with one or more example embodiments, the recovered regenerant salt may be recycled to regenerate solid ion-removal material such as ion-exchange resins. One advantage of the example embodiments is a reduction in the quantity of salt that must be discarded from the regeneration process, thereby reducing pollution associated with the discarding of the spent regenerants. Another advantage is that higher dosage of salt can be used in a regeneration cycle without substantially impacting the amount of salt that is to be discarded. Still another advantage is that the contaminant removed by the resin can be isolated and recovered in a concentrated form.

Various features and advantageous details are explained more fully with reference to the non-limiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

II. Solid Ion-Removal Materials

As used herein, "solid ion-removal material" refers to any solid material that is capable of absorbing or removing dissolved or suspended reagents such as ions from a solution, which may include adsorbents such as iron oxide, ion-exchange materials such as organic resins, and pellets of inorganic materials such as activated alumina.

Certain aspects of the invention include the use of any solid ion-removal material that can be regenerated by contacting the solid ion-removal material with an electrolyte to restore the material's activity in removal or absorption of ions.

In certain embodiments, solid ion-removal material such as ion exchange resins may be employed for selective removal of ions from aqueous solutions and regeneration by salt, and may be included in methods and systems for reuse of recovered regenerant salt from the spent regenerant.

Ion exchange resins may include cation exchangers, which have positively charged mobile ions available for exchange, and anion exchangers, whose exchangeable ions are negatively charged. Both anion and cation resins can be produced from the same basic organic polymers. They differ in the ionizable group attached to the hydrocarbon network. It is this functional group that determines the chemical behavior of the resin. Resins can be broadly classified as strong or weak acid cation exchangers or strong or weak base anion exchangers. Ion exchangers may also use inorganic materials, for example, zeolites.

III. Electrodialysis for Regenerant Recovery

In general, electrodialysis (ED) is used to transport salt ions from one solution through ion-exchange membranes to another solution under the influence of an applied electric potential difference. This is done in a configuration called an electrodialysis cell. The cell consists of a feed (diluate)

compartment and a concentrate (brine) compartment separated by an anion exchange membrane and a cation exchange membrane placed between two electrodes. In almost all practical electrodialysis processes, multiple electrodialysis cells are arranged into a configuration called an electrodialysis stack, with alternating anion and cation exchange membranes separating the solution compartments of multiple electrodialysis cells. Electrodialysis processes are unique compared to distillation techniques and other membrane based processes (such as reverse osmosis) in that dissolved species are moved away from the feed stream rather than the reverse.

In certain aspects, the invention relates to a process and system that utilizes electrodialysis to recover regenerant salt from the spent brine of brine-regenerated ion-exchange processes and utilize the recovered salt to regenerate the resins. For example, the invention can be utilized to remove undesired contaminants from a feed stream such as a drinking water source, or it can be used to recover a valuable constituent from a process stream.

The salt-recovery process utilizes an ED system comprising one or more selective ion-exchange membrane(s) that effectively block or reduce the transport of the ionic species that is intended to be removed by the ion-exchange process and recover the regenerate ions which permeate the membrane. NaCl is the salt commonly used as a regenerant, but the scope of this invention covers any salt or electrolyte that can be used as a regenerant, such as base or acid.

A. Electrodialysis for Cations

1. Systems Using Selective Membranes for Cations

Selective membranes for cations may be used in certain aspects of the present invention. Such a selective membrane may have higher permeability of monovalent cations, such as $Na^+$, as compared with multivalent cations, such as $Ca^{2+}$ and $Mg^{2+}$.

A non-limiting example of monovalent-cation-selective ion-exchange membrane is Neosepta® CIMS manufactured by Tokuyama Corp. of Japan. CIMS membrane is used to recover NaCl from sea water. Unpublished data presented at the 1990 International Conference on Membranes in Chicago by F. Hanada indicate that the relative transport number (RTN) of CIMS for Na/Mg is 25 with 0.5 N solutions and 50 with 2N solutions. Thus the selectivity for $Na^+$ ions doubles as the concentration is raised by a factor of four. An RTN value of 50 means that 2% of the current is carried by $Mg^{2+}$ and 98% of the current is carried by $Na^+$ when the concentrations of the two ions in solution are equal. Other Neosepta® membranes useful in this process include CMS and CMX-S.

Referring to FIG. 1, a schematic representation is shown of an embodiment of a membrane arrangement 100 for electrodialysis-mediated recovery of salt containing monovalent cations. For example, the arrangement may include an array of alternating anion-exchange membranes, designated as A, and monovalent-cation-selective ion-exchange membranes, designated as CS. In this embodiment the membrane CS represents any selective cation-exchange membrane with the capability to retard the transport of multivalent cations (such as $Ca^{2+}$) while allowing monovalent cations (such as $Na^+$) to pass through, and the membrane A represents an anion-exchange membrane that is capable of transmitting the anions (such as $Cl^-$) in the solution being treated. These two membranes, A and CS, the depleting solution compartment 102, and concentrating solution compartment 104 associated with the membrane pair comprise a cell pair. Many cell pairs are typically stacked between a pair of electrodes to form an ED stack.

Under the influence of direct current, anions and cations within the spent regenerant migrate toward the anode and cathode electrodes, respectively. As shown in FIG. 1, a feed stream of the spent regenerant containing various ions (such as $Na^+$, $Ca^{2+}$, and $Cl^-$) enters the depleting solution compartment 102 formed by the A-CS membrane pair as described above. In the compartment 102, the cation-selective membrane CS allows monovalent cations to pass through toward the cathode, but acts as a barrier to multivalent anions such as hardness ions like $Ca^{2+}$, therefore causing these multivalent anions to stay in the compartment 102 to form a process stream enriched in $Ca^{2+}$ (Diluate $CaCl_2$) and the anion membrane A allows anions to pass through toward the anode. Monovalent cations such as Na pass through the cation-selective membrane CS to enter the neighboring concentrating solution compartment 104, forming a process stream enriched in $Na^+$ (concentrated NaCl).

For example in water softening, the blocking membrane CS may be a monovalent-cation-selective ion-exchange membrane that has the ability to pass $Na^+$ ions and reject $Ca^{2+}$ ions and other divalent cations associated with hardness. This selectivity is not absolute, so some salt remains in the discarded brine and some $Ca^{2+}$ leaks into the recovered NaCl, but the selectivity is sufficient for recovery of a large fraction of the regenerant from the spent brine. The fact that the salt is reused in the process allows the possibility that the resin regeneration can be accomplished with salts that might be too expensive for use in processes where the spent regenerant is discarded.

Figure 2:
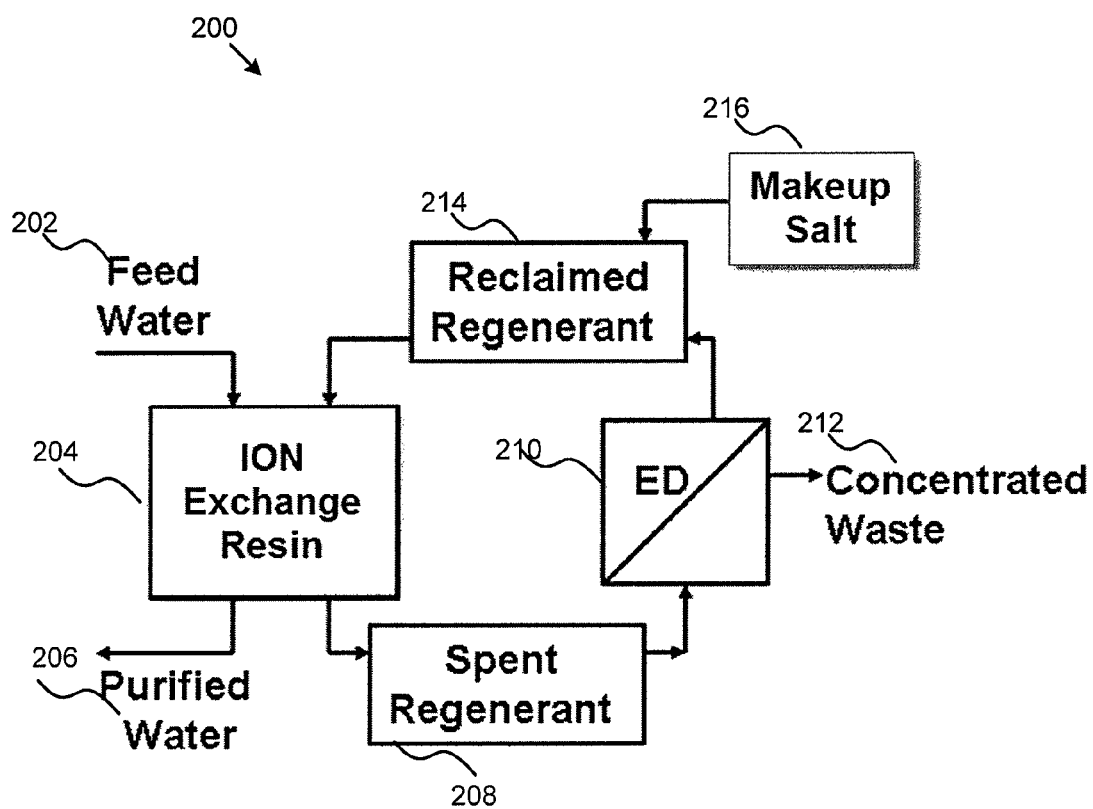
FIG. 2 is a schematic representation illustrating one embodiment of the invention for selective separation of ions in regenerant.

FIG. 2 illustrates an embodiment of a flow scheme and system for operation of the present invention to recover the spent regenerant. As shown, the aqueous solution 202 is fed to an ion exchange resin 204 for removal of certain contaminating ions such as multivalent ions or organic ions from the solution 202 and produce purified water 206. Once the ion exchange resin 204 is substantially saturated with contaminating ions, it needs to be regenerated to remove these contaminating ions from the resin 204 by applying regenerant from the reservoir 214. The regenerant from the reservoir 214 may be added to the resin 204 and produce spent regenerant after rinse. The spent regenerant containing contaminating ions and regenerant ions may be collected in the reservoir 208 and then subject to the ED system or stack 210, which comprises membranes selective for regenerant cations as compared with contaminating ions. In certain embodiments, the ED 210 may comprise a plurality of repeating units, also called repeating cells, wherein such a unit comprises a single type of selective membranes. By using the selective membranes, the electrodialysis system 210 could produce at least two streams, one forming concentrated waste 212 enriched in contaminating ions, and the other forming a stream of reclaimed regenerant containing the enriched regenerant ions, which could be recycled for feeding the reservoir 214 for next cycle of regeneration of the resin 204. In certain aspects, makeup regenerant from a reservoir 216 may be added to the reservoir 214 for complete regeneration of the resin 204.

2. Selective Cation Separation in Water Softening

Salt-regenerated water softeners utilize cation-exchange resins to remove hardness from water and replace them with sodium ions. A typical water softener comprises a resin bed, an open-top brine tank and a controller. NaCl crystals are poured into the brine tank, and a solution for regenerating the resins flows through the bed of salt crystals, where it becomes substantially saturated, and then through the resin bed. The success of this method of water softening is attributable to a phenomenon known as "selectivity reversal." Selectivity reversal is manifested in water softening with certain zeolites and cation-exchange resins as a preference for uptake of multivalent cations under conditions of low salinity and a preference for uptake of monovalent cations under conditions of high salinity. It is well known by those skilled in the art of water softening that the selectivity of strong-acid cation-exchange resins favors the uptake of hardness ions when the salinity of the solution is low and the release of hardness ions when the salinity of the solution is high. In the practice of conventional water softening, hard water with low salinity is allowed to flow through a bed of cation-exchange resins that are in the Na form. The hardness ions exchange with $Na^+$ ions and remain on the resin. When the resins are loaded with hardness ions, a concentrated solution NaCl (regenerant) is allowed to pass through the resin bed. The $Na^+$ ions replace hardness ions that were on the resin, and the hardness ions transfer into the brine. In the conventional practice of water softening the spent regenerant containing a mixture of hardness multivalent ions and the monovalent $Na^+$ ions is then discarded, which result in potentially problematic waste.

Figure 3:
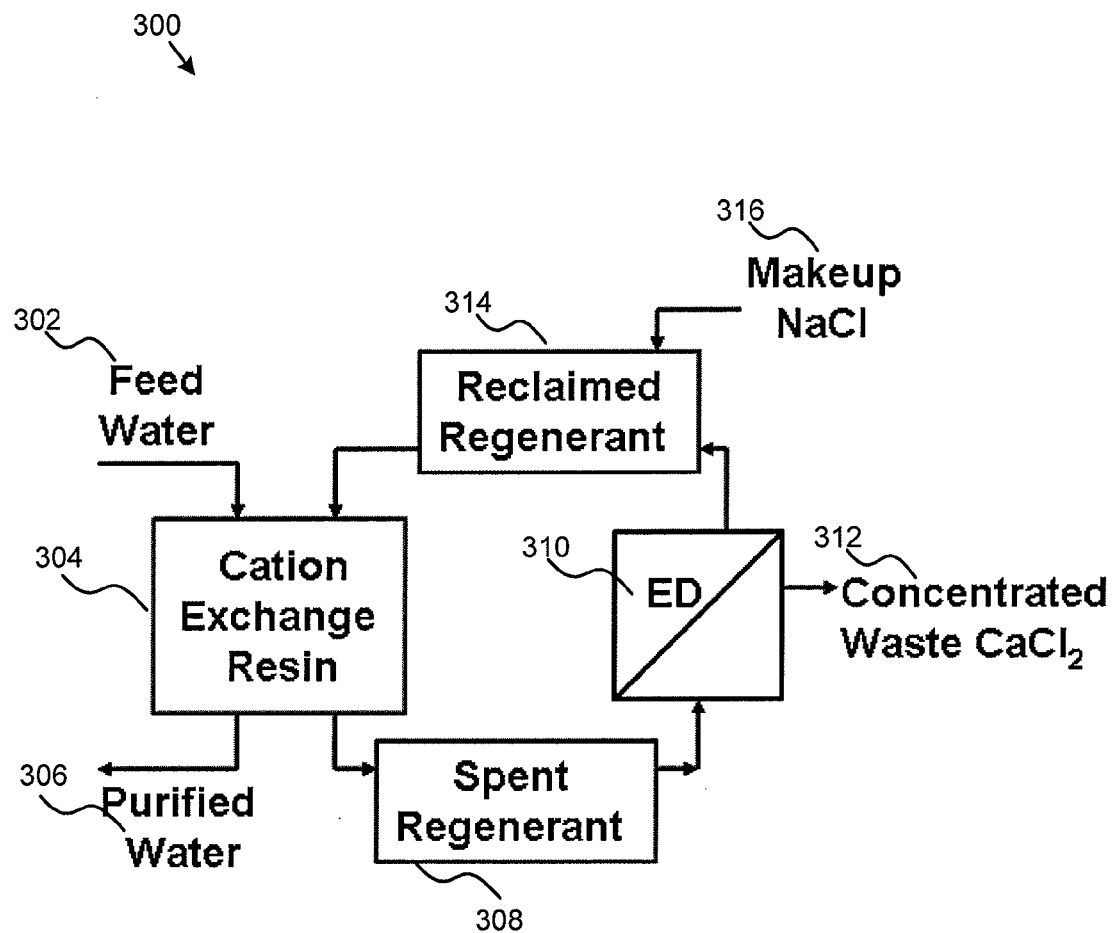
FIG. 3 is a schematic representation illustrating one embodiment of the invention for selective separation of ions in regenerant used in water softening.

FIG. 3 illustrates an embodiment of a flow scheme and system 300 for operation of the present invention for the water softening system to alleviate the problem of salty brine disposal. As shown, the feed water 302 (for example, a saline water source) is fed to a cation exchange resin 304 for removal of hardness ions (usually multivalent ions such as $Ca^{2+}$ and $Mg^{2+}$) from the feed water 302 and produce purified water 306. Once the cations exchange resin 304 is substantially saturated with hardness ions, it needs to be regenerated to remove hardness ions from the resin 304 by applying regenerant from the first reservoir 314. For example, a salt solution containing monovalent ions such as NaCl may be added to the resin 304 for regeneration and produce spent regenerant comprising a mixture of $Na^+$, $Ca^{2+}$, $Mg^{2+}$ and $Cl^-$ ions for feeding the second reservoir 308. For separation of $Na^+$ from multivalent ions to recover the regenerant NaCl, the spent regenerant in the reservoir 308 may be subjected to an electrodialysis (ED) system 310, which comprises membranes selective for monovalent cations as described above. In certain embodiments, the ED 310 may comprise a plurality of repeating units, wherein such a unit comprises a single type of monovalent-cation-selective membranes. The electrodialysis system 310 could produce at least two streams, one forming concentrated waste 312 such as $CaCl_2$, and the other forming a stream of reclaimed regenerant containing the enriched regenerant NaCl for feeding the first reservoir 314. The reclaimed regenerant in the reservoir 314 may be fed into the cation exchange resin 304 for regeneration using the recovered NaCl.

In certain embodiments, a defined amount of supplementary regenerant 316 such as makeup NaCl may be added to the reclaimed regenerant in the reservoir 314, thereby forming a regenerant with a concentration sufficient to regenerate the cation exchange resin 304 and a next water softening cycle may be started after regeneration with the reclaimed regenerant, or optionally in combination with the makeup regenerant.

An illustrative embodiment of a system in accordance with FIG. 3 may include a container (e.g., a vessel) containing the following components: a cation-exchange resin 304, an ED stack 310 comprising a monovalent selective cation-exchange membrane such as CIMS in the repeating cell pairs and an oxidation-resistant cation-exchange membrane adjacent to the anode compartment, a reservoir 308 for the spent regenerant solution, a reservoir 314 (initially for pure regenerant before the first cycle of regeneration) for the recovered salt solution (reclaimed regenerant), an electrode rinse tank with a water-soluble salt as the electrolyte circulating through the electrode-rinse compartments of the ED stack 310 (not shown), pumps to circulate the electrode rinse, the purified brine and the hard brine, and a salt saturator (not shown).

In a particular embodiment, the salt for the electrode rinse may comprise anions that form substantially soluble salts with cations that would be present in the electrode rinse solution. Since the electrode rinse compartments are bounded on one side by a cation-exchange membrane, the anion of the electrode rinse is effectively trapped in the circulating rinse solution. For example, the anion for the electrode rinse could be an anion that is not permissible in the potable water produced by the softener. A specific example of such an anion is nitrate.

The reservoirs 308 and 314 for the spent regenerant and reclaimed regenerant respectively can be two separate tanks or specifically a two-chamber tank with the chambers separated by a flexible diaphragm to reduce the size of the system.

Before the beginning of a regeneration of the cation-exchange resin bed, the first reservoir 314 may be substantially full and contains primarily purified regenerant (e.g., NaCl). The regenerant could be pumped through the vessel containing cation-exchange resin 304 and into the second reservoir 308 containing spent regenerant.

In certain embodiments, the system could include a diverter valve (not shown in FIG. 3) to divert a predetermined amount of the first spent brine to waste. This diversion could eliminate the portion of the brine with the highest hardness. For example, the portion of brine diverted could be between at least or about 1% and 50% of the total brine used for regeneration, and more particularly the portion diverted would be between at least or about 10% and 25%. After that diversion the remaining spent brine could be collected in the second reservoir 308.

In certain embodiments, near the end of the regeneration when the volume of the first reservoir 314 that provides regenerant is nearly depleted, a measured amount of makeup NaCl brine prepared with commercial softener salt could be transferred into the reservoir 314 to supplement the reclaimed regenerant and used as the last quantity of regenerant. The use of pure NaCl brine as the last quantity of regenerant could cause the resin column 304 to be converted almost completely to the Na form.

In a certain embodiment, the brine or regenerant that is in the voids of the column 304 can be drained into a separate reservoir (not shown in FIG. 3), such as a chamber of the feed tank, and serve as the initial volume to be re-circulated through the concentrating compartments 104 of the ED stack 100. The spent regenerant in the reservoir 308 could be circulated through the depleting compartments 102 of the ED stack 100. The electric current (e.g., direct current (DC)) flowing through the ED stack 100 could carry the regenerant ions such as $Na^+$ and $Cl^-$ ions and their associated water of hydration through the membranes such that the volume in the separate reservoir increases as the volume of the reservoir 308 decreases.

As the processing of the batch of brine proceeds, the ratio of $Na^+$ to $Ca^{2+}$ (and other hardness multivalent cations) in the remaining spent regenerant decreases, because $Na^+$ ions have been selectively removed. As the $Na^+/Ca^{2+}$ ratio in the ED diluate decreases, the portion of electric current carried through the CS membrane by $Ca^{2+}$ ions increases (due to incomplete rejection of $Ca^{2+}$ cations) and eventually reaches a point of diminishing returns as the quality of the recovered regenerant solution becomes less appropriate for its intended use.

In a certain embodiment, an end point could be selected for termination of NaCl recovery before the point of diminishing returns. For example, the end point for the ED treatment could be based on one or more of the following: a predetermined time interval; attainment of a specified current or voltage of the ED stack; conductivity of the diluate (because $CaCl_2$ and $MgCl_2$ solutions are less conductive than equivalent NaCl solutions); density of the diluate (because $CaCl_2$ and $MgCl_2$ solutions are less dense than equivalent NaCl solutions); hardness level in the solution in the first reservoir 314; volume of the solution in the second reservoir 308; or some other measurable property of the system.

In certain embodiments, this invention may include means for storage of portions of the recovered regenerant based on its quality (NaCl concentration and Na/Ca ratio). One means of segregating the portions is to store them in multiple containers. Another means, which may be particular, is to store the regenerant in a container that is unmixed so that the more dense solution, that with highest NaCl concentration and highest Na/Ca ratio, gravitates to the bottom of the tank. During the regeneration step the recovered regenerant of lowest quality, the solution in the top of the unstirred tank, is used first, because that solution, along with the large amount of easily removed Ca, could be diverted to waste at the beginning of the regeneration cycle.

The process and system described above for water softening may be also applicable to the removal of any multivalent cations, such as heavy metals and radionuclides including uranyl ions, which are divalent cations.

B. Electrodialysis for Anions

Certain aspects of the invention may also include the recovery of regenerant in anion-exchange systems.

1. Selective Anion Separation in Water Treatment

For example it is known that anion-exchange resin can be utilized to remove hexavalent chromium (Cr(VI)) from water. The resins can be regenerated with concentrated solution of NaCl. In a specific embodiment of the invention, water contaminated with Cr(VI) is allowed to flow through a bed of anion-exchange material that has been previously converted to the Cl-ion form. After exhaustion, the ion-exchange material is regenerated with a solution of NaCl.

In certain aspects of the invention, the spent brine from the regeneration may be treated with ED utilizing monovalent-selective anion-exchange membranes such as Neosepta® ACS. The chromate ($CrO_4^=$) ions could be effectively rejected by ACS. Thus substantially all of the electric current could be carried through the ACS membrane by $Cl^-$ ions at the beginning of the electrodialysis operation. As the concentration of $Cl^-$ ions becomes depleted, the $CrO_4^=$ ions could carry a larger portion of the current. The recovery of NaCl could be terminated before the concentration of $CrO_4^=$ ions in the recovered NaCl becomes appreciable. If it is desirable to reduce the concentration of $Cl^-$ ions in the diluate further, the ED could be continued, but the concentrate could be diverted to another container for use as the first portion of salt solution used in the regeneration of the ion-exchange bed. The systems and methods for the anion exchange could be substantially similar to that used for water softening as described above.

2. Selective Anion Separation in Sulfate and Arsenate Removal

The presence of sulfate in certain saline water sources limits the degree to which fresh water can be recovered by reverse osmosis or evaporation, because the residual solution of concentrated salts tends to form $CaSO_4$ scale that is difficult to remove from the membranes or heat-exchange surfaces. There are commercially available anion-exchange resins that selectively remove sulfate ions from aqueous feed solution and can be regenerated with NaCl solution that is more concentrated than the feed. Examples of sulfate-selective resins include Purolite A 300 and Ionac ASB-2. In an anion-exchange process for sulfate removal, sulfate-laden feed solution specifically flows downward through the resin bed until breakthrough is detected or until a predetermined amount of solution has been treated. After the resin bed is backwashed, regenerant solution, for example 1 molar NaCl, is allowed to flow through the resin bed to elute the sulfate, and then the resin bed is rinsed to displace the regenerant solution. Regeneration of sulfate-loaded resins with NaCl produces a spent regenerant that contains a mixture of NaCl and $Na_2SO_4$.

In certain aspects of the invention, a system comprising ED with monovalent-anion-selective membrane may be used to produce a concentrate solution rich in NaCl and a diluate solution rich in $Na_2SO_4$. The $Na_2SO_4$-rich solution can be discarded or it can be further concentrated to produce a salable product. Since the process for removal of sulfate from the feed water utilizes only anion-exchange resins, the process can be operated in a manner that the spent regenerant is essentially free of divalent cations such as calcium that tend to precipitate when the sulfate is concentrated.

Figure 4:
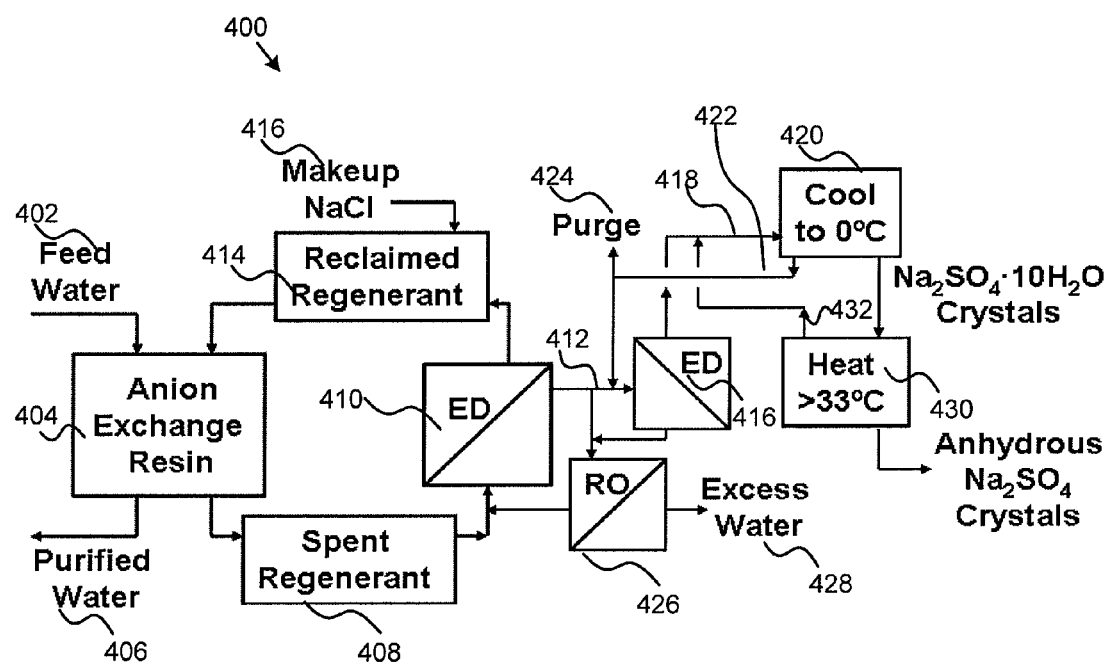
FIG. 4 is a schematic representation illustrating one embodiment of the invention for selective separation of ions in regenerant used in sulfate and arsenate removal.

FIG. 4 illustrates an exemplary flow scheme 400 for removal of certain contaminating ions such as sulfate or a combination of sulfate and arsenate in certain aspects of the present invention. In certain aspects, this process may be used to remove $Na_2SO_4$ as crystals, which may allow further concentration of $Na_2HAsO_4$. As shown, the aqueous solution 402 is fed to an ion exchange resin 404 for removal of certain contaminating ions such as multivalent anions or organic ions from the solution 402 and produce purified water 406. Once the ion exchange resin 404 is substantially saturated with contaminating anions, it needs to be regenerated to remove these contaminating anions from the resin 404 by applying regenerant from the reservoir 414. The regenerant from the reservoir 414 may be added to the resin 404 and produce a spent regenerant. The spent regenerant containing contaminating ions and regenerant ions may be collected in the reservoir 408 and then treated in the ED system or stack 410, which comprises membranes selective for regenerant anions as compared with contaminating anions. The electrodialysis system 410 could produce at least two streams, one forming concentrated waste 412 enriched in contaminating anions (e.g., $Na_2SO_4$-rich solution), and the other forming a stream of reclaimed regenerant containing the enriched regenerant ions, which could be recycled for feeding the reservoir 414 for next cycle of regeneration of the resin 404. In certain aspects, makeup regenerant 416 may be added to the reservoir 414 for complete regeneration of the resin 404.

Figure 8:
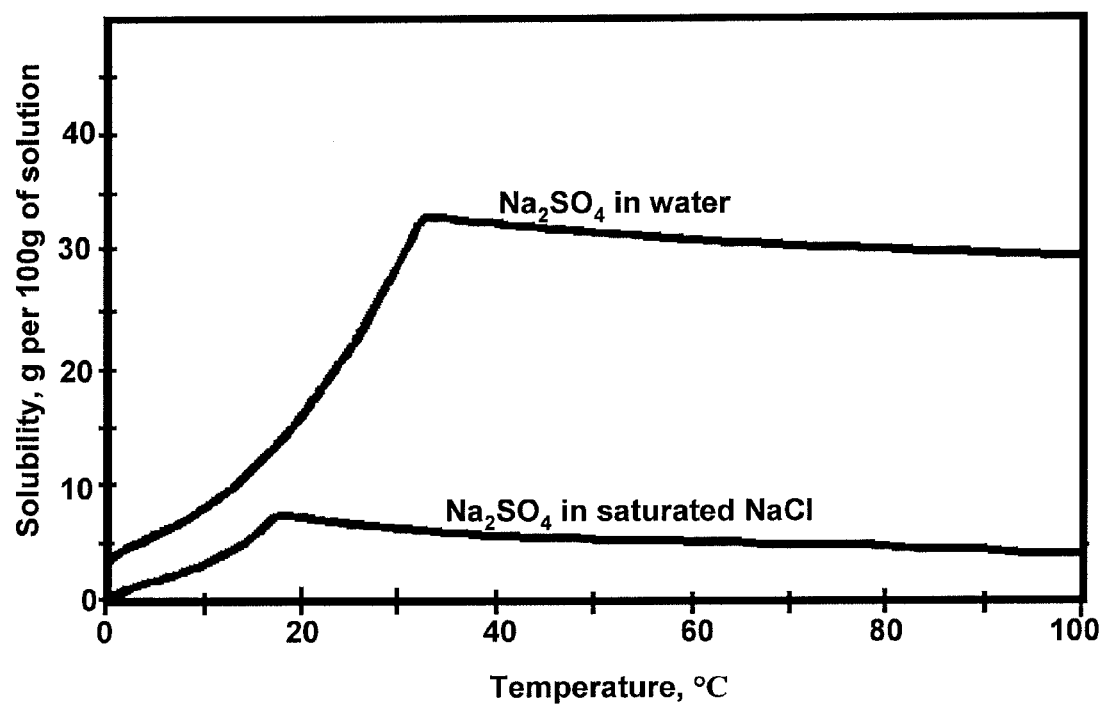
FIG. 8 is a graphical representation illustrating the solubility of sodium sulfate in water and saturated NaCl solution.

In certain aspects to remove the high concentration contaminating ions (sulfate) from the waste stream 412, a second ED system (stack) 416 with ordinary anion-exchange and cation-exchange membranes may be used for further concentrating the high concentration contaminating ions such as $Na_2SO_4$ so that $Na_2SO_4$ can be recovered in a salable form, for example, a crystalline form. In a specific embodiment the $Na_2SO_4$-rich solution is fed to a second ED system 416 that operates at an elevated temperature, particularly in the range of at least or about 30-35° C. and produces a concentrate stream 418 with a concentration of $Na_2SO_4$ that approaches, but is safely below, the saturation condition at the selected operating temperature. For example, the solubility of sodium sulfate in water is illustrated in FIG. 8. As shown, the solubility of $Na_2SO_4$ is a function of temperature and salinity of the solution. A maximum solubility of about 49.7 grams per 100 grams of water (about 3.1 molar) is attainable at about 32.4° C., and the solubility drops dramatically when temperature is reduced (available via world wide web at vias.org/genchem/inorgcomp_sodiumsulfate.html). The solubility and temperature of maximum solubility are both lower when NaCl is present in the solution.

Figure 9:
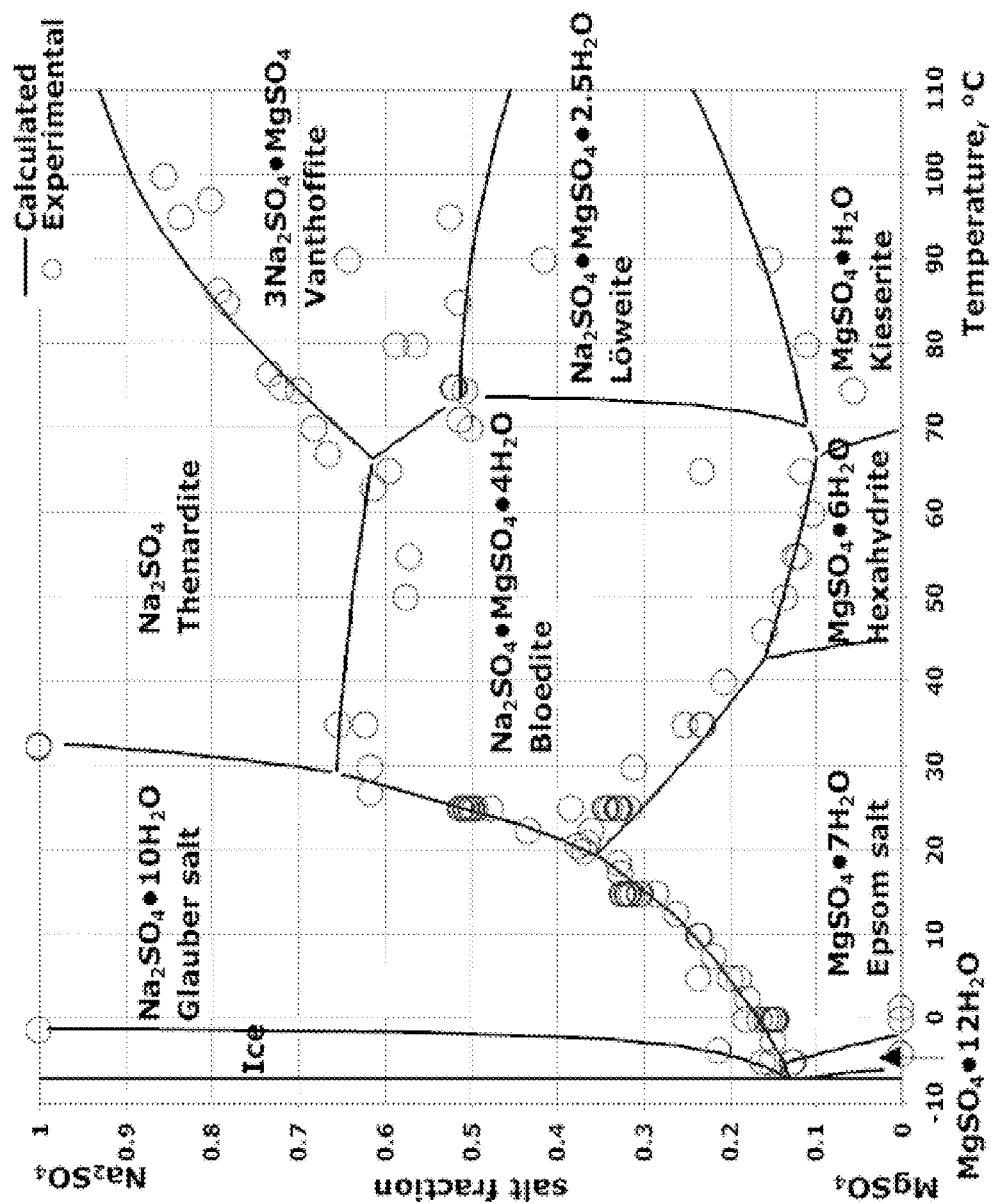
FIG. 9 represents a phase diagram of a sodium sulfate and magnesium sulfate system.

It is recognized that conditions may exist in which the transport of water through the membranes is insufficient to keep the salts in the concentrate compartments, particularly the sodium sulfate, below their solubility limits. In such situations, means for ensuring that solubility limits are not exceeded in the stream enriched in sodium sulfate may include one or a combination of the following: a) addition of dilution water (the water could be derived from the permeate of the reverse osmosis process with appropriate treatment, such as softening, to remove undesired ionic species); b) elevation of the operating temperature to increase the solubility of the salts (in the case of sodium sulfate, temperature elevation may not need to substantially exceed about 33° C., which is reported to be the temperature of maximum solubility of sodium sulfate); c) removal from the circulating stream a portion of the salt that is prone to precipitation (in the case of sodium sulfate, removal may be achieved by diverting a portion of the stream to a crystallizer 420, reducing the temperature of the removed solution to the point where crystals of sodium sulfate form, removing the crystals, warming the supernatant, and returning the warm supernatant to the circulating stream). For example, referring to FIG. 9, a phase diagram of the system sodium sulfate and magnesium sulfate is illustrated. The zones in the figure represent the composition of solid crystals in equilibrium at the temperature shown on the bottom scale with a saturated solution with the properties of the two salts indicated on the left-hand scale. For a pure solution of sodium sulfate, the composition may be that shown at the top of the figure. FIG. 9 indicates that a crystal of $Na_2SO_4 \cdot 10H_2O$ (Glauber salt) may be converted to anhydrous sodium sulfate (Thenardite) when it is heated above about 33° C.

A specific embodiment of this invention may further include a means for conveying the warm, ED-produced concentrate 418 to a means 420 of cooling the solution to crystallize the $Na_2SO_4$. The means of conveyance and cooling can be conventional technology such as a heat exchanger and a chiller. The cooler 420 preferably operates at a temperature close to but not substantially below 0° C. to form crystals of $Na_2SO_4 \cdot 10H_2O$. The mother liquor 422 from the crystallizer 420 may be returned to the feed of the second ED 416 with a portion diverted to purge 424 to remove impurities, and in certain aspects to produce a purge stream with the arsenate isolated and made available in a higher concentration, because the high concentration sulfate is removed as crystalline material in the cooler 420 or further removed by production of anhydrous crystals by the heater 430 as described below.

In certain aspects, at a temperature below the temperature of the operating temperature of the ED system 416 (for example, a temperature of at most or about 33° C. to about 0° C., or any value or range derivable therein), hydrated crystals of $Na_2SO_4 \cdot 10H_2O$ may form when the concentrated solution is cooled in the cooler 420. However, the hydrate decomposes when the crystals are heated to temperature above 33° C. In a certain embodiment, the diluate from the second ED 416 and a portion of the diluate from the first ED 410 may be sent to a reverse osmosis (RO) system 426 to remove excess water from the system. The removed water 428, which is the permeate from the RO 426, can be discarded or it can be utilized for rinsing the ion-exchange resin 404 at the end of the regeneration step.

In a particular embodiment of this invention the hydrated crystals may be conveyed to a heater 430 that operates at a temperature above 33° C. to form anhydrous $Na_2SO_4$ and a second mother liquor 226 that is essentially saturated in $Na_2SO_4$. The mother liquor 432 from production of the anhydrous crystals may be specifically returned to the cooler 420. In a particular embodiment cooling in the cooler 420 may be achieved with an expanding refrigerant, and heat for decomposing the hydrate may be specifically recovered from the compressed refrigerant.

Figure 5:
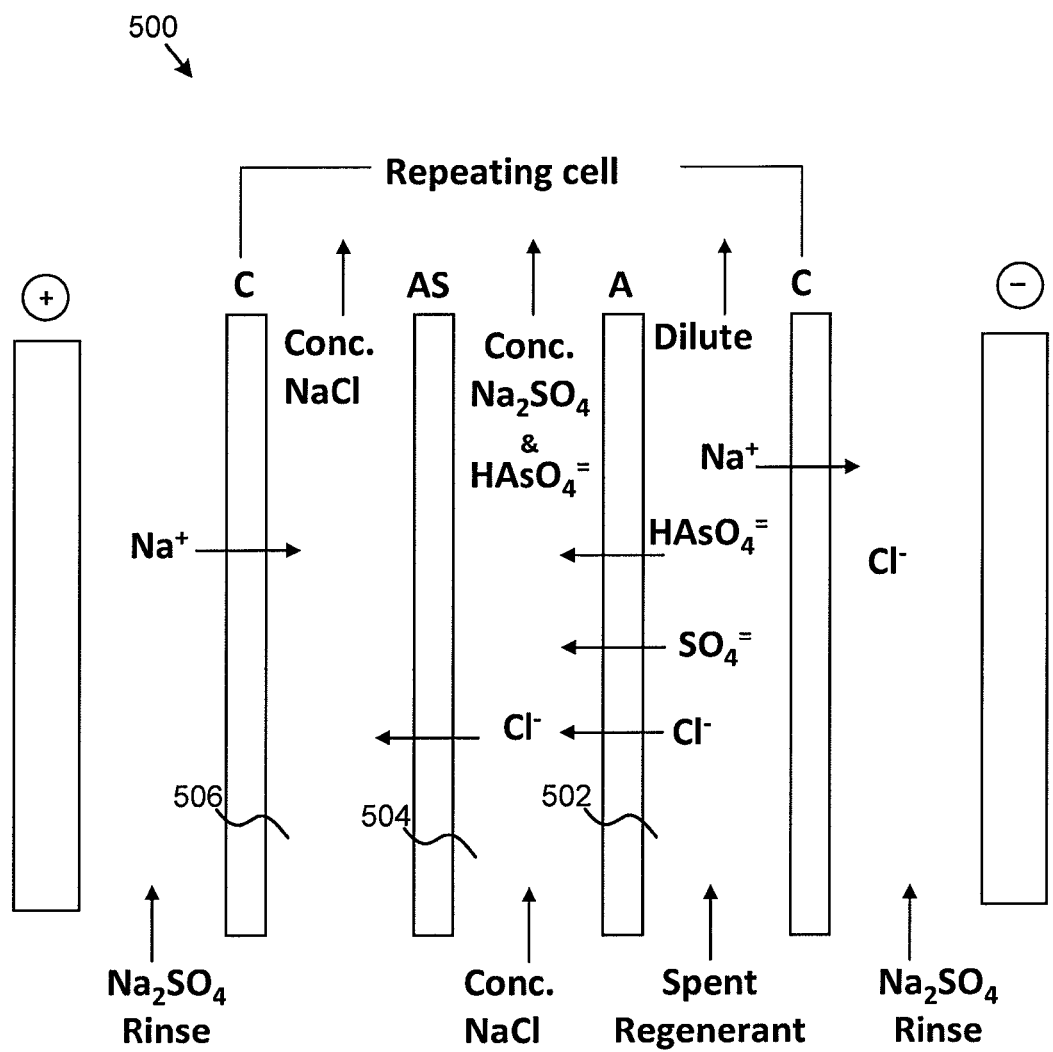
FIG. 5 is a schematic representation illustrating another embodiment of the invention of an electrodialysis membrane arrangement.
Figure 6:
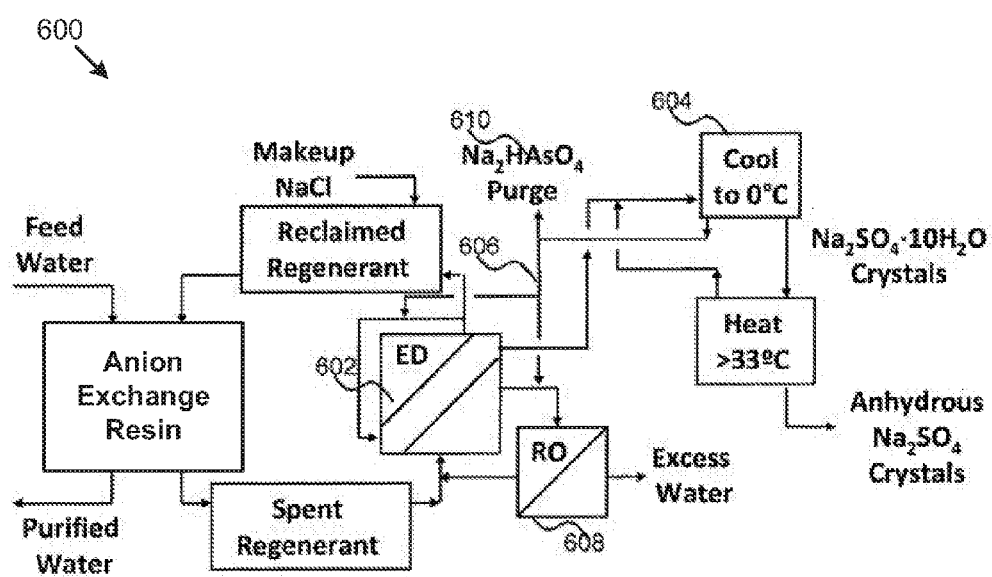
FIG. 6 is a schematic representation illustrating another embodiment of the invention for selective separation of ions in regenerant used in sulfate and arsenate removal.

FIG. 5 illustrates an alternate arrangement 500 of membranes and solution compartments. This embodiment describes an alternate configuration that utilizes three membranes in a repeating cell. The benefit of utilizing three membranes is that it eliminates one electrodialysis stack as shown in FIG. 6 as compared with FIG. 4. A repeating cell in such an arrangement may include a first membrane (C) permeable to the cations of the monovalent salt, a second membrane (AS) with higher permeability of the anions of the monovalent salt than for the multivalent anions, and a third membrane (A) permeable to anions, thereby separating the spent regenerate into at least a first stream enriched in the monovalent salt (Concentrated NaCl) in the compartment 506, a second stream enriched in the multivalent anion (Concentrated $Na_2SO_4$ and $HAsO_4^{2-}$) in the compartment 504, and a third stream substantially or completely depleted of ions (Dilute) in the compartment 502.

In an embodiment, the spent regenerant may flow through a solution compartment 502 between two ordinary ion-exchange membranes (membrane A and membrane C) in the arrangement 500. For example, the cation-exchange membrane on the right (C) may remove the $Na^+$ ions, which are the only cations in the illustrative spent regenerant. The ordinary anion-exchange membrane, designated by A, to the left of the spent regenerant compartment 502 removes both monovalent and divalent anions. The monovalent-anion-selective membrane, designated by AS, removes primarily $Cl^-$ ions and leaves $SO_4^{2-}$ and $HAsO_4^{2-}$ ions in the solution exiting that compartment 504. Some supplemental NaCl may be added to the center compartment 504. Supplemental NaCl may be needed because the current through the A membrane is carried by $Cl^-$, $SO_4^{2-}$ and $HAsO_4^{2-}$ anions, but only $Cl^-$ carries current through the AS membrane. Without supplemental NaCl, the center compartment 504 could run out of $Cl^-$ ions and there would not be sufficient $Na^+$ ions to balance the charge of the $SO_4^{2-}$ and $HAsO_4^{2-}$ anions that are intended to be trapped in the center compartment 504. As there is an abundance of NaCl in the recovered regenerant, that stream of recovered regenerant may be used as the source of supplemental NaCl. The level of addition of supplemental NaCl may be sufficient to allow some NaCl to exit with the $Na_2SO_4$ and $Na_2HAsO_4$ so that the concentration of CF does not drop to such an extent that the $SO_4^{2-}$ and $HAsO_4^{2-}$ anions could carry an appreciable portion of the electric current through the AS membrane.

FIG. 6 illustrates an exemplary flow scheme 600 for removal of certain contaminating ions such as sulfate or a combination of sulfate and arsenate by using an ED system 602 having a three-membrane cell arrangement in accordance with FIG. 5. FIG. 6 is essentially carried out as FIG.

4 except the use of a three-membrane cell ED system 602 (with three solution compartments illustrated as 502-506), which may reduce the complexity and cost of the process, for example, by eliminating the need of a second ED system. In certain aspects to prevent a buildup of NaCl in the crystallization loop comprising a crystallizer 604, a portion of the cool mother liquor 606 from the production of $Na_2SO_4.10H_2O$ may be directed to the feed of the center compartment 504 in the ED system 602. The NaCl in the mother liquor 606 may serve as a portion of the supplemental NaCl and the $Na_2SO_4$ and $Na_2HAsO_4$ in the mother liquor 606 pass straight through the compartment 504 and return to the crystallizer 604. Control of the water balance in the crystallizer loop may be accomplished by directing a portion of the cool mother liquor 606 from the crystallizer 604 to the reverse osmosis 608. $Na_2HAsO_4$ is removed through the purge 610.

3. Selective Anion Separation in Arsenic Removal a. Arsenic Removal Using Ion Exchange Arsenic in drinking water is a problem worldwide, affecting more than 70 countries and 137 million people (world wide web via uswaternews.com/archives/arcglobal/7manynati9.html). The US Environmental Protection Agency (EPA) has regulated the arsenic concentration allowed in drinking water since 1975 under the Safe Drinking Water Act. in the Act of 1975 amount of arsenic permitted in drinking water before treatment is required was set at 0.05 milligrams per liter (mg/L), or 50 parts per billion (ppb). Subsequently the EPA reduced the allowable level for arsenic in drinking water to 10 ppb and set the deadline for compliance as January, 2006. That decision caused many suppliers of municipal drinking water to take action in order to remain in compliance.

Soluble arsenic can occur in water in two oxidation states, As(III) and As(V). The soluble form of As(III) is arsenious acid ($As(OH)_3$, pKa 9.23) is not ionized at neutral pH. As(V) ($H_3AsO_4$, pKa 2.25, 6.77, 11.60) exists primarily as a divalent arsenate anion ($HAsO_4^{2-}$) in neutral to slightly basic solutions. As(III) can be oxidized to As(V) by conventional techniques, so arsenate removal techniques can be applied generally to removal of soluble arsenic. Considerable research was done on a variety of arsenic-removal methods, and several methods were found to be effective.

Ion exchange onto anion-exchange resins or activated alumina and adsorption onto iron oxide have been reported for arsenic removal. The performance of Purolite A-300 (Strong-base, Type-II, anion exchange resin) in the treatment of groundwater containing arsenate at 24 µg/L and sulfate at 23.7 mg/L was reported by Wang et al. (2000). Treatment of 3000 bed volumes (BV) was achieved before breakthrough of arsenic was detected in one plant. Wang et al. utilized the phenomenon of selectivity reversal to remove the arsenate from the resin. The resin was regenerated by addition of NaCl brine solution at 10 lb salt/ft³ of resin. The regeneration of the A300X resin column consisted of four steps: upflow backwash, downflow brine, downflow slow rinse, and downflow fast rinse. Arsenate concentrations as high as 77 mg/L and sulfate levels as high as 25 g/L were seen in the regenerant effluent. Thus the arsenate in the regenerant was about 3000 times as high as in the groundwater. In another pilot test of the report Wang et al. reported arsenate concentrations averaged 56.7 µg/L in the raw water and 1.4 µg/L in the finished water. That resin was regenerated with a solution of KCl.

Although anion exchange is an effective method for removal of arsenic from drinking water, the spent regenerant solution containing arsenate and a large amount of salt presents a disposal problem. Certain aspects of the invention described here solve that disposal problem by recovering the salt for reuse in the regeneration process.

Wang et al. (2000) also reported the use of activated alumina (AA) on a throw-away basis for arsenic removal. Arsenate levels were 45 µg/L in the groundwater and 6 µg/L in the treated water. Treatment of 9,600 BV at one plant and 5,260 BV at another. The arsenic-laden AA was discarded in both cases. A comment by Wand indicated that resins were easier to regenerate than AA. However, problems still remain for regeneration of anion-exchange resins used in arsenic removal.

b. Systems and Methods for Selective Anion Removal

As described above, anion exchange is also useful for removing anions such as arsenic anions from water supplies. Arsenic in groundwater is usually present as arsenate, and its removal by NaCl-regenerated ion exchange is reported by Wang et al. (2000). Certain aspects of the present invention provide methods and systems for selective removal of arsenic ions from a spent regenerant.

Arsenate is substantially in the divalent ion form at neutral pH, so arsenate anions could be processed similarly to sulfate in the scheme 400 illustrated in FIG. 4 or the flow scheme 600 illustrated in FIG. 6. However, arsenate anions in groundwater would normally be found in concentrations much lower than sulfate concentration. The solubility of $Na_2HAsO_4$ is reported to be 61 g per 100 g of water at 15° C. (available via world wide web at inchem.org/documents/icsc/icsc/eics1208.htm). Therefore, arsenate salts would not crystallize in the chiller or crystallizer 420, but rather their concentration would build up to relatively high levels in the solution circulating through the RO 426, second ED 416 and crystallizer 420. The arsenate salt would ultimately leave the process in the purge stream 424 shown in FIG. 4. Consequently the flow scheme illustrated in FIG. 4 is also applicable to a process for removal of arsenate from a feed stream such as groundwater. It should be noted that the crystallizer 420 may not be needed if the water to be treated does not contain an appreciable amount of sulfate.

Figure 7:
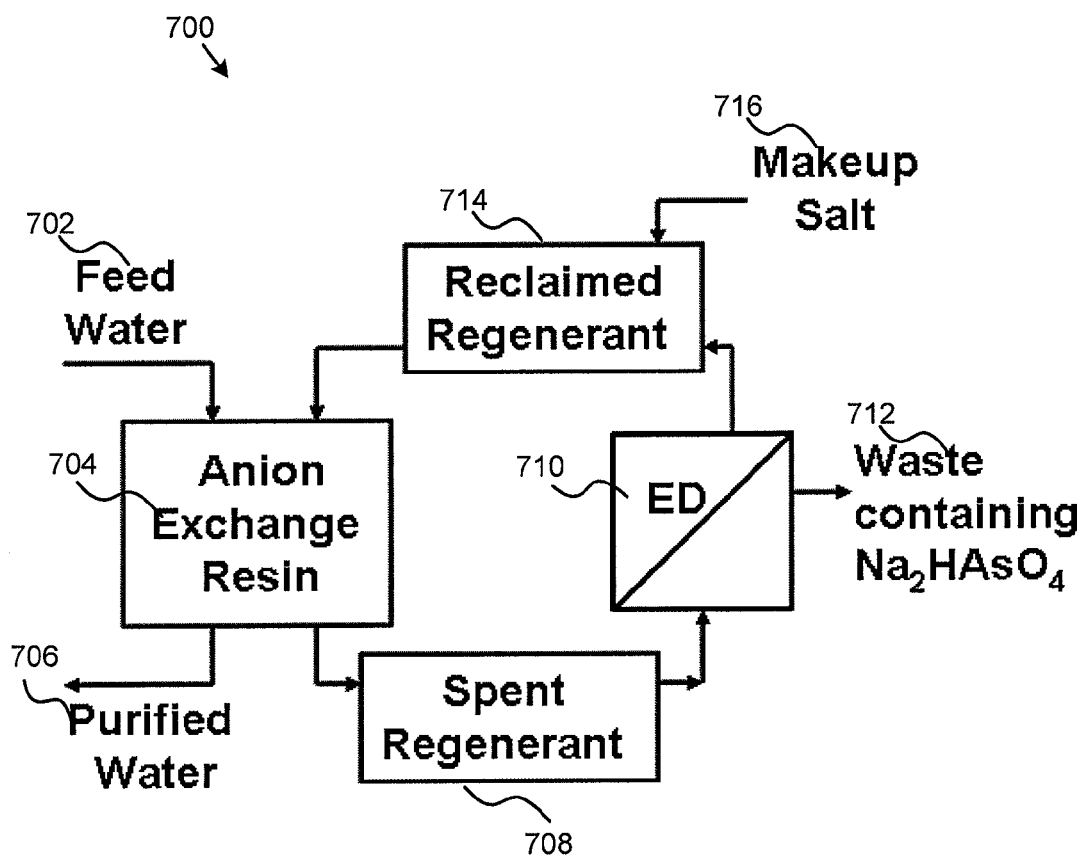
FIG. 7 is a schematic representation illustrating one embodiment of the invention for selective separation of ions in regenerant used in arsenic removal.

FIG. 7 illustrates a flow scheme of an embodiment of the invention. For example, this process may be used in the case of low sulfate in an arsenate-contaminated water supply for recovery of spent regenerant from arsenate removal. As shown, the aqueous solution 702 may be fed to an ion exchange resin 704 for removal of certain contaminating ions such as multivalent anions or organic ions (e.g., arsenate) from the solution 702 and produce purified water 706. Once the ion exchange resin 704 is substantially saturated with contaminating anions, it needs to be regenerated to remove these contaminating anions from the resin 704 by applying regenerant from the reservoir 714. The regenerant from the reservoir 714 may be added to the resin 704 and produce a spent regenerant. The spent regenerant containing contaminating ions, illustrated as $HAsO_4^{2-}$, and regenerant ions may be collected in the reservoir 708 and then treated in the ED system or stack 710, which comprises membranes selective for regenerant anions as compared with contaminating anions. The electrodialysis system 710 could produce at least two streams, one forming concentrated waste 712 enriched in contaminating anions, illustrated as $HAsO_4^{2-}$, and the other forming a stream of reclaimed regenerant containing the enriched regenerant ions, which could recycle for feeding the reservoir 714 for the next cycle of regeneration of the resin 704. In certain aspects, makeup regenerant 716 may be added to the reservoir 714 for complete regeneration of the resin 704.

IV. Electrodialysis in Treatment of Organic Ion-Containing Solution

Organic solutes are often present in surface water and water from shallow wells. Typical organics that are present in water include Natural Organic Matter (NOM) and detergents. NOM occurrence is attributed to the decomposition of vegetation and often imparts a color similar to that of tea. The soluble portion of NOM typically is comprised of humic material that has carboxyl functional groups that cause problems in water desalination processes. In processes utilizing anion-exchange materials (anion-exchange resins or anion-exchange membranes) the humic material tends to become attached to the functional groups of the anion-exchange materials, which results in fouling.

In pressure driven processes like Reverse Osmosis (RO), the humic materials tend to interact with Ca ions in the water and foul the surface of the RO membrane. A known method for removal of NOM and detergents is to contact the contaminated solution with anion-exchange resins that are specially prepared to pick up the contaminants. A commercial process for NOM removal is MIEX. After the MIEX resins are loaded with NOM, they are treated with a concentrated NaCl solution that causes the NOM to be released from the resin. The spent regenerant from this process contains a mixture of salt and the removed NOM (and/or detergent). This invention includes a method for recovering the salt from the spent regenerant used in the recovery of organic anions.

Some soluble organic compounds have cationic characteristics. A notable example is a class of compounds called "quats," because they have quaternary ammonium functional groups with a positive ionic charge. Quats are used as herbicides, strengthening agents for paper, and cleaning agents in the manufacture of microelectronics. Some quats are known to be harmful to aquatic organisms. Quats have affinity for solids with cation-exchange characteristics, notably cation-exchange resins, and these solids can be regenerated with salt solutions. Aspects of this invention include a method for recovering the salt from the spent regenerant used in the recovery of quats.

Aspects of the anion-exchange process described above may be also useful for the recovery of regenerant salt from a spent regenerant used in the removal of soluble organic anions from solution. The process is applicable to the removal of undesirable organic contaminants and to the recovery of desirable organic anions from solution. In the process of the invention, feed solution containing organic anions contacts a solid anion-exchange material that has affinity for the organic anions to be removed. After the solid anion-exchange material is substantially loaded with the organic anions, the solid anion-exchange material is contacted with a solution of a regenerant electrolyte that causes release of the organic anions from the solid anion-exchange material into the electrolyte solution. A particular solid anion-exchange material is a column of anion-exchange resin beads, and a particular regenerant electrolyte is NaCl.

In certain aspects of the invention, the spent regenerant (the electrolyte solution containing the organic anions removed from the solid anion-exchange material) is circulated through the depleting compartments of an electrodialysis system that removes a substantial portion of the regenerant salt and leaves a substantial portion of the organic anions in the diluate solution. In particular, the electrodialysis may contain a selective membrane that has higher permeability for non-organic ions than for organic ions.

Conventional anion-exchange membranes can become fouled by organic anions that migrate in the electric field but are too large to pass through the membrane. The organic ions that collect on the membrane surface increase the electrical resistance of the membrane and can lead to a phenomenon known in the art as "water splitting."

Certain aspects of the present invention may include methods and systems comprising selective membranes that have higher permeability for non-organic ions than organic ions, therefore separating organic ions from non-organic ions. For example, certain aspects of the invention may be intended to include the use of a non-ionic membrane that allows small ions, both cations and anions, to penetrate but blocks the passage of large anions. This technique is known in the art as "transport depletion."

The selective membrane may be used in combination with one or more of the additional techniques to deal with fouling of the membrane by large organic anions: use of anion-exchange membranes that have a surface that resists fouling; periodic reversal of the electric potential applied to the electrodes of the electrodialysis stack to push the collected organic ions off the membrane (this technique is known in the art as "electrodialysis reversal"); periodic interruption of the electric current flowing through the electrodialysis system to allow the collected organic anions to move away from the membrane and flow out of the depleting compartment; periodic addition of a cleaning agent to remove the organic anions from the membrane (this technique is known in the art as "cleaning in place").

V. Solid Ion-Removal Material Coating with Polyelectrolytes

Certain treatment methods for adsorption of arsenic (primarily arsenate anions) may use particles of iron oxide (such as $Fe_2O_3$). In large facilities the iron oxide is prepared in-situ from iron salts, but in smaller installations the use of pellets of iron oxide is more manageable. In both cases the arsenate-laden iron oxide is discarded, typically to a landfill. Disposal is not a satisfactory solution, because the arsenate can desorb from the iron oxide and be released to the environment. However, in the absence of a satisfactory method for regeneration and reuse of the iron oxide sorbent, landfilling is the accepted practice. Certain aspects of this invention include a method for dealing with fragile pellets of iron oxide so that they can be regenerated with brine and the salt from the spent brine can be recovered.

It has been reported that pellets made of particles of iron oxide have adsorptive properties suitable for removal of arsenate from groundwater. Although the adsorbed arsenate can be removed by treatment with an electrolyte solution such as NaCl, the pellets are reported to be too fragile to withstand the regeneration conditions.

In certain aspects of the invention, there is provided a method for treating solid ion-removal material such as pellets of iron oxide to make them suitable for regeneration with brine. For example, the treatment encapsulates the pellets of iron oxide in an anion-permeable polymer to keep them from fragmenting and to allow the arsenate anions to penetrate into the pellets. The polymer could be any material that is permeable to anions. The polymer may be a polyamine and particularly a quaternary amine. The coating could be applied by techniques known in the science of micro-encapsulation. The treatment technique may be applicable to the coating of any particles whose friability can be reduced by a polymer coating.

In a particular treatment method solid ion-removal material such as ion oxide particles may be soaked with a cross-linking agent, either neat or in solution. In certain aspects, the solvent is immiscible with water, and specifically the solvent and the cross-linking agent are sufficiently volatile to allow their recovery after the coating has been applied. An example of a cross-linking agent that can be applied neat is dibromopropane (DBP). After the solid ion-removal material is soaked with cross-linking agent, they may be suspended in an aqueous solution of an amine, specifically a polyamine. An example of a suitable amine is polyethyleneimine (PEI). The cross-linking agent inside a solid ion-removal material may react with amine groups in the solution at the solution/solid interface and form a thin film. The film-coated solid ion-removal material may be washed to remove excess amine from the surface of the solid ion-removal material, and then the coating on the solid ion-removal material is cured if necessary to improve its strength. Subsequently the coated solid ion-removal material may be heated or treated in a vacuum or both to drive off the solvent and the unused cross-linking agent. The amine groups on the coating polymer may be specifically converted to the quaternary form by treatment with a quaternizing agent. An example of a quaternizing agent useful in this process is methyl iodide.

In certain aspects of the invention, the cross-linking of solid ion-removal material with a film of polyelectrolyte such as polymeric coating may be followed by regeneration of the coated ion-removal material and, in a further embodiment, by recovery of spent regenerant with electrodialysis. The treatment of certain friable solid ion-removal material (for example, the iron oxide particles) with the methods described above could allow the solid ion-removal to withstand the regeneration condition and make it easier to handle.

REFERENCES

The following references, to the extent that they provide exemplary procedural or other details supplementary to those set forth herein, are specifically incorporated herein by reference.

Wang et al., Report from Battelle, Columbus. EPA/600/R-00/088, October, 2000. Available via world wide web at epa.gov/nrmrl/pubs/600r00088/600r00088.pdf

What is claimed is:

1. A process for recovery and reuse of ions from a spent regenerant, comprising the steps of:
    a) providing a solution of spent regenerant from a regeneration of a first solid anion-removal material with a monovalent salt, wherein the spent regenerant comprises a mixture of monovalent ions and multivalent anions, wherein the multivalent anions comprise chromate, arsenate, selenite, sulfate, or a combination thereof;
    b) treating the spent regenerant with an electrodialysis system having a selective membrane, wherein the electrodialysis system has a plurality of three-membrane repeating cells, each cell comprising a first membrane permeable to the cations of the monovalent salt, a second membrane with higher permeability of the anions of the monovalent salt than for the multivalent anions, and a third membrane permeable to anions, thereby separating the spent regenerant into at least a first stream enriched in the monovalent salt, a second stream enriched in the multivalent anion, and a third stream substantially depleted of ions; and
    c) reusing the first stream for regeneration of the first or a second solid anion-removal material.

2. The process of claim 1, wherein the monovalent salt is sodium chloride.

3. The process of claim 1, wherein the selective membrane impairs the transport of multivalent anions.

4. The process of claim 1, further comprising concentrating multivalent ions in the second stream.

5. The process of claim 4, wherein the multivalent anions comprise sulfate.

6. The process of claim 4, wherein the multivalent anions comprise sulfate and arsenate.

7. The process of claim 4, further comprising crystallizing a sulfate salt from a sulfate.

8. A process for recovery and reuse of ions from a spent regenerant, comprising the steps of:
    a) providing a solution of spent regenerant from regeneration of a solid anion-removal material with a monovalent salt, wherein the spent regenerant comprises a mixture of monovalent ions derived from the monovalent salt and removed anions derived from the first anion-removal material, wherein the removed anions comprise arsenate, sulfate, chromate, selenate, organic anions, or combinations thereof; and
    b) treating the spent regenerant with an electrodialysis system having a selective membrane, wherein the selective membrane has higher permeability for the monovalent ions than for the removed ions, wherein the electrodialysis system has a plurality of three-membrane repeating cells, each cell comprising:
        a first membrane permeable to the cations of the monovalent salt;
        a second membrane comprising the selective membrane, a first compartment between the first and second membranes;
        a third membrane permeable to anions, wherein the anions comprise anions of the monovalent salt and the removed anions;
        a second compartment between the second and third membranes; and
        a third compartment between the third membrane and another of the cells;
        wherein the treating comprises separating the spent regenerate into at least a first stream enriched in the monovalent salt in the first compartment, a second stream enriched in multivalent anions in the second compartment, and a third stream substantially depleted of ions in the third compartment.

9. The process of claim 8, wherein the removed anions comprise sulfate.

10. The process of claim 9, further comprising crystallizing a sulfate salt from the sulfate.

11. The process of claim 8, wherein the removed anions comprise arsenate.

12. The process of claim 11, wherein the anion-removal material comprises iron oxide.

13. The process of claim 12, wherein the anion-removal material further comprises an anion-permeable polymer encapsulating the iron oxide.

14. The process of claim 8, wherein the removed anions comprise arsenate and sulfate.

15. The process of claim 14, further comprising crystallizing a sulfate salt from the sulfate, wherein the crystallizing comprises producing a purge comprising the arsenate.

* * * * *